United States Patent
Matsushita et al.

(10) Patent No.: US 9,613,749 B2
(45) Date of Patent: Apr. 4, 2017

(54) MANUFACTURING DEVICE FOR FIELD POLE MAGNET BODY AND MANUFACTURING METHOD FOR SAME

(71) Applicant: NISSAN MOTOR CO., LTD., Yokohama-shi, Kanagawa (JP)

(72) Inventors: Yasushi Matsushita, Yokohama (JP); Hideki Watanabe, Sagamihara (JP); Takashi Sekikawa, Yokohama (JP); Kimio Nishimura, Yokohama (JP); Kazuhiro Takaichi, Yokohama (JP); Akihisa Hori, Yokohama (JP); Takumi Ohshima, Yokohama (JP); Michito Kishi, Yokohama (JP); Kunitomo Ishiguro, Odawara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 415 days.

(21) Appl. No.: 14/362,766

(22) PCT Filed: Nov. 6, 2012

(86) PCT No.: PCT/JP2012/078753
§ 371 (c)(1),
(2) Date: Jun. 4, 2014

(87) PCT Pub. No.: WO2013/084644
PCT Pub. Date: Jun. 13, 2013

(65) Prior Publication Data
US 2014/0360009 A1  Dec. 11, 2014

(30) Foreign Application Priority Data
Dec. 7, 2011 (JP) ................................. 2011-267721

(51) Int. Cl.
*H01F 7/06* (2006.01)
*H01F 41/02* (2006.01)
(Continued)

(52) U.S. Cl.
CPC ....... *H01F 41/0253* (2013.01); *H01F 7/0221* (2013.01); *H02K 15/00* (2013.01);
(Continued)

(58) Field of Classification Search
CPC ........ H02K 15/03; H02K 15/00; H02K 1/276; H01F 41/0253; H01F 7/0221; B32B 18/00; Y10T 29/49075; Y10T 29/5313
(Continued)

(56) References Cited

U.S. PATENT DOCUMENTS 7,468,112 B2 * 12/2008 Sato ................. B32B 18/00
156/154
8,510,933 B2 * 8/2013 Murakami ........... H01F 7/0221
29/417
(Continued)

FOREIGN PATENT DOCUMENTS

| JP | 2004-328927 A | 11/2004 |
| JP | 2009-033958 A | 2/2009 |
| JP | 2009-142081 A | 6/2009 |

OTHER PUBLICATIONS

U.S. Appl. No. 14/363,943, filed Jun. 9, 2014, Matsushita et al.

Primary Examiner — Donghai D Nguyen
(74) Attorney, Agent, or Firm — Foley & Lardner LLP

(57) ABSTRACT

A manufacturing device for a field pole magnet body includes a reference jig having reference surfaces in the lengthwise direction, width direction, and thickness direction for positioning a plurality of cleaved and divided magnet fragments in an aligned state. The manufacturing device further includes a first pressing means that presses the
(Continued)

plurality of magnet fragments to the thickness direction reference surface from the thickness direction of a magnet body to align them in the thickness direction, and a second pressing means that presses the plurality of magnet fragments to the width direction reference surface from the width direction of the magnet body to align them in the width direction. An operational axis line of a pressing part of at least one of the first and second pressing means is arranged to be tilted such that it approaches the lengthwise direction reference surface at the side that abuts the magnet fragments.

4 Claims, 13 Drawing Sheets

(51) Int. Cl.
*H02K 15/03* (2006.01)
*H02K 15/00* (2006.01)
*H01F 7/02* (2006.01)
*H02K 1/27* (2006.01)

(52) U.S. Cl.
CPC .............. *H02K 15/03* (2013.01); *H02K 1/276* (2013.01); *Y10T 29/49075* (2015.01); *Y10T 29/5313* (2015.01)

(58) Field of Classification Search
USPC ......... 29/417, 421.1, 428, 598, 607; 156/60, 156/154, 580; 310/152
See application file for complete search history.

(56) References Cited

U.S. PATENT DOCUMENTS

| | | | |
|---|---|---|---|
| 8,747,583 B2* | 6/2014 | Takaichi | H01F 41/0253 |
| | | | 29/607 |
| 9,214,846 B2* | 12/2015 | Fubuki | H02K 15/03 |
| 2010/0244608 A1 | 9/2010 | Nakamura et al. | |

* cited by examiner

MANUFACTURING DEVICE FOR FIELD POLE MAGNET BODY AND MANUFACTURING METHOD FOR SAME

TECHNICAL FIELD

The present invention relates to a manufacturing device for a field pole magnet body to be installed in a rotor core of a rotating electric machine, as well as a manufacturing method for the same.

BACKGROUND ART

As a conventional field pole magnet body to be installed in a rotor core of an embedded permanent magnet-type rotating electric machine, there has been a field pole magnet body formed by cleaving and dividing a magnet body that is rectangular in a plan view (hereinafter referred to simply as a "magnet body") into a plurality of magnet fragments and then adhering the plurality of magnet fragments to each other. In this way, by forming the field pole magnet body with a plurality of magnet fragments and reducing the volume of each magnet fragment, current surges that occur due to fluctuations in the acting magnetic field are reduced. Thereby, heat generation of the field pole magnet body that accompanies current surges is suppressed, and thus irreversible thermal demagnetization is prevented (refer to JP2009-33958A).

In JP2009-33958A, the cleaved surfaces of the magnet fragments that have been cleaved are abutted facing each other and the cleaved surfaces are adhered to each other with an adhesive to integrate them into a field pole magnet body, and this can be easily inserted into a rotor or the like and magnetized.

SUMMARY OF INVENTION

In the case that the cleaved surfaces of the magnet fragments that have been cleaved are adhered to each other via an adhesive, for example, the flat surfaces and side surfaces of each magnet fragment are abutted against a reference jig. Subsequently, a method is carried out in which the magnet fragments are aligned and positioned by pressing them against the jig from the flat surfaces and side surfaces by pressing means and then pressurized from the lengthwise direction of alignment for adhesion.

However, there are cases in which a force may be applied in a direction that differs from the originally intended direction of pressurization for adhesion due to, for example, positional deviations, deformations, and the like of the pressing means that aligns and positions the magnet fragments in the jig, and this has led to problems in that the adhesive force between the magnet fragments may become unstable.

The present invention was created in consideration of the above-described problems, and an object thereof is to provide a manufacturing device for a field pole magnet body that is suited to stabilizing the adhesive force between magnet fragments as well as a manufacturing method for the same.

The manufacturing device for a field pole magnet body according to one embodiment manufactures a field pole magnet body to be installed in a rotating electric machine by aligning and bonding a plurality of magnet fragments formed by cleaving and dividing a magnet body in the width direction. In order to do so, the manufacturing device includes a reference jig having reference surfaces in the lengthwise direction, width direction, and thickness direction for positioning the plurality of cleaved and divided magnet fragments in an aligned state with their cleaved faces facing each other. The manufacturing device further includes a first pressing means configured to press the plurality of magnet fragments to the thickness direction reference surface from the thickness direction of the magnet body to align them in the thickness direction, and a second pressing configured to press the plurality of magnet fragments to the width direction reference surface from the width direction of the magnet body to align them in the width direction. In addition, an operational axis line of a pressing part of at least one of the first and second pressing means is arranged to be tilted such that it approaches the lengthwise direction reference surface at the side that abuts the magnet fragments.

Embodiments of the present invention and advantages of the present invention will be explained in detail below together with the attached drawings.

DESCRIPTION OF EMBODIMENTS

The manufacturing device for a field pole magnet body and the manufacturing method for the same will now be explained below based on embodiments.

(First Embodiment)

First, a field pole magnet body to be installed in a rotating electric machine to which the present invention is applied will be explained.

Figure 1:
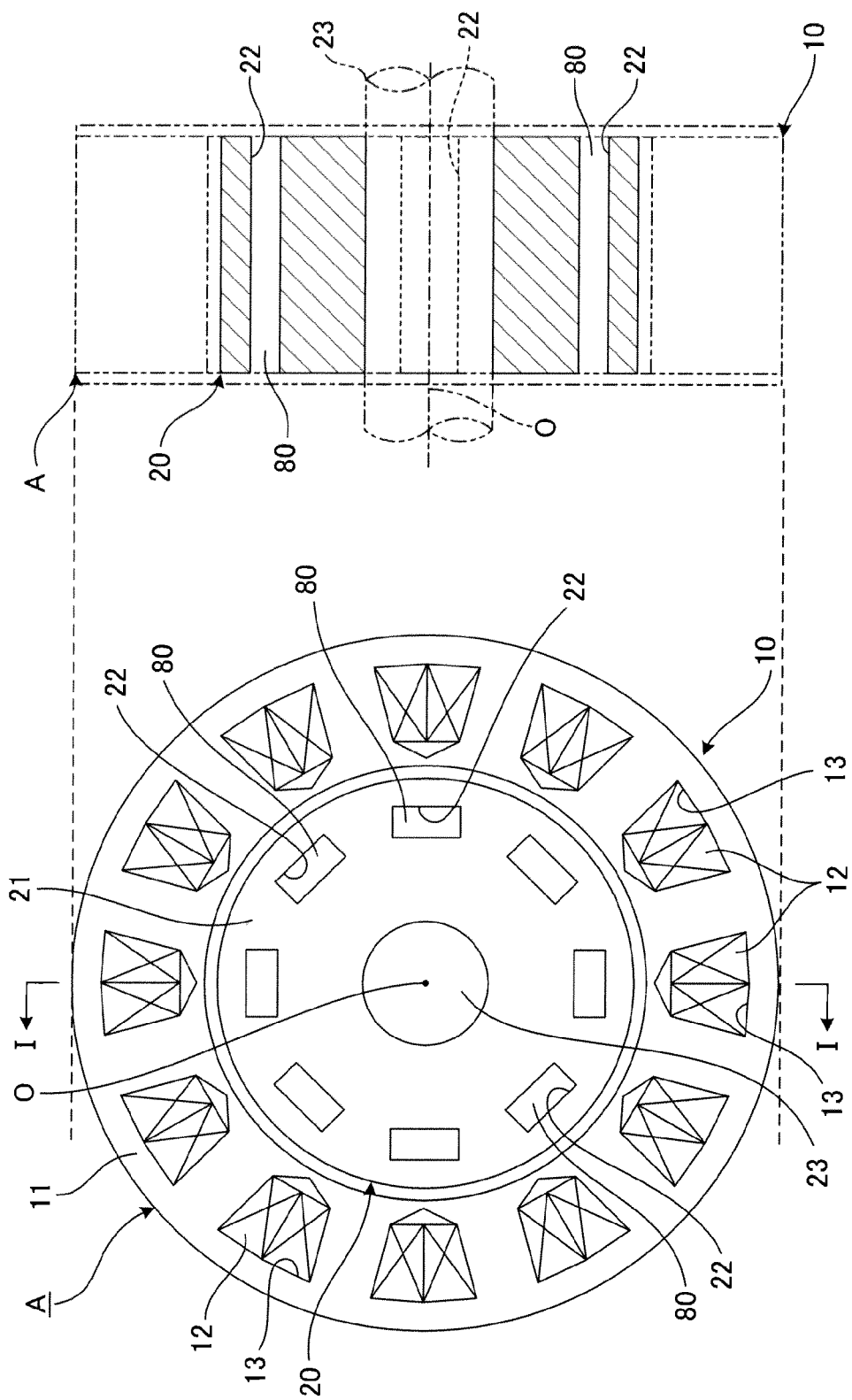
FIG. 1 is a view illustrating a schematic constitution of a rotating electric machine to which a magnet body manufactured by a manufacturing device for a field pole magnet body according to one embodiment is applied.

FIG. 1 is a schematic constitutional view illustrating the constitution of the essential parts of a permanent magnet-type electric motor to which a magnet body manufactured by the manufacturing device for a field pole magnet body according to the present embodiment is applied. In FIG. 1, the drawing on the left side is a cross-section view of the permanent magnet-type electric motor, and the drawing on the right side is a side view. An embedded permanent magnet-type rotating electric machine A (hereinafter referred to simply as "rotating electric machine") includes an annular stator 10 that constitutes a portion of a casing (not illustrated) and a cylindrical rotor 20 that is arranged coaxially with the stator 10.

The stator 10 includes a stator core 11 and a plurality of coils 12. The plurality of coils 12 are accommodated in slots 13 formed in the stator core 11 at intervals of equal angles on the same circumference centered on an axial center O.

The rotor 20 includes a rotor core 21, a rotating shaft 23 that rotates integrally with the rotor core 21, and a plurality of field pole magnet bodies 80. The plurality of field pole magnet bodies 80 are accommodated in slots 22 formed at intervals of equal angles on the same circumference centered on the axial center O.

Figure 2:
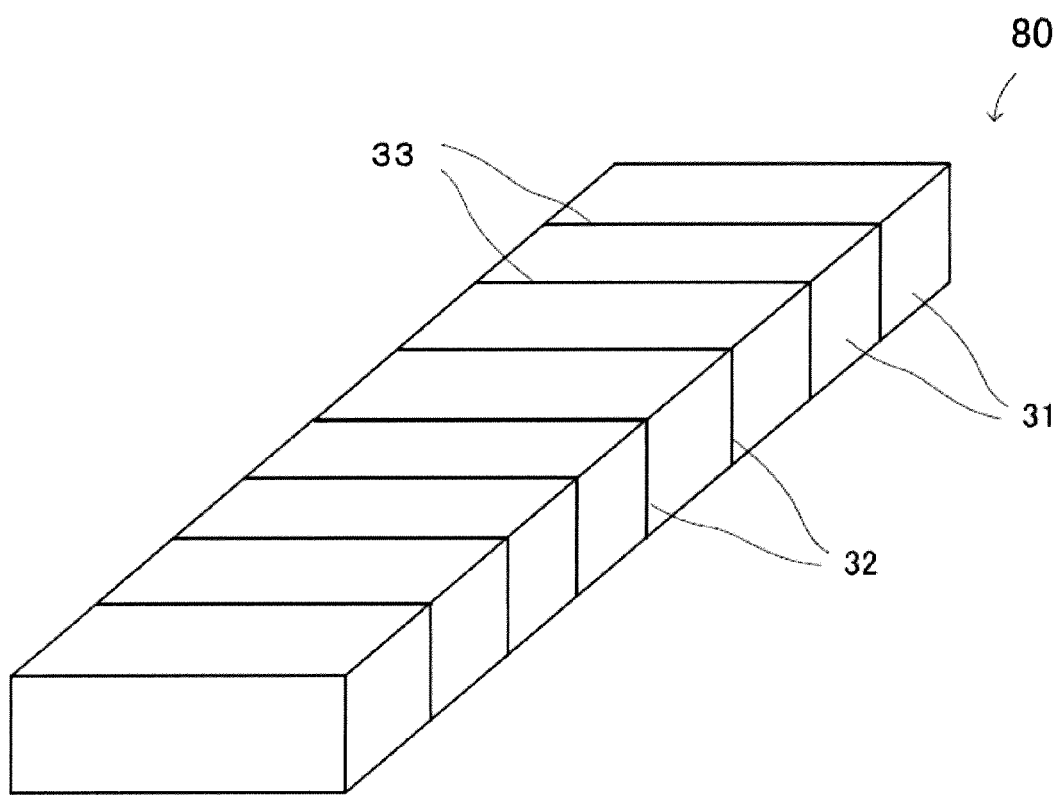
FIG. 2 is a perspective view of a field pole magnet body.

The field pole magnet bodies 80 accommodated in the slots 22 of the rotor 20 are each constituted as an aggregate of a plurality of magnet fragments 31 divided by cleaving in a width direction a magnet body 30 that is rectangular in a thickness direction plan view as shown in FIG. 2. More specifically, each field pole magnet body 80 is constituted as an aggregate of the magnet fragments 31 aligned in a row by adhering the cleaved surfaces of the plurality of magnet fragments 31 to each other with a resin 32. The resin 32 to be used exhibits heat resistance of, for example, approximately 200° C., and for example, an epoxy thermosetting adhesive or the like is used. Glass beads or insulating cloth that functions as a spacer is blended into the adhesive to secure a clearance between the magnet fragments 31 and electrically insulate adjacent magnet fragments 31 from each other. Thereby, current surges that occur due to fluctuations in the acting magnetic field are reduced by keeping them within the individual magnet fragments 31. Therefore, heat generation of the field pole magnet bodies 80 that accompanies current surges is suppressed, and thus irreversible thermal demagnetization is prevented.

In order to cleave a magnet body 30 into a plurality of magnet fragments 31, it is effective to form notch grooves 33 in advance at the areas at which the magnet body 30 is to be cleaved. The magnet body 30 in which the notch grooves 33 are formed will now be explained below, but the notch grooves 33 are not essential to the present invention. In other words, if the magnet body 30 can be cleaved without providing the notch grooves 33, then the notch grooves 33 do not have to be provided on the magnet body 30. The flatness of the cleaved surfaces when the magnet body 30 is cleaved into the magnet fragments 31 is enhanced the deeper from the surface the notch grooves 33 are formed or the sharper the tips at the end of the notch grooves 33 are formed.

As a method for forming the notch grooves 33, mention may be made of providing them in the course of molding the magnet body 30 by protruding stripes for groove formation provided in the die of the magnet body 30, providing them by mechanical processing such as a dicer or a slicer, providing them by laser beam irradiation, providing them by wire-cut electrical discharge machining, and the like.

Figure 3:
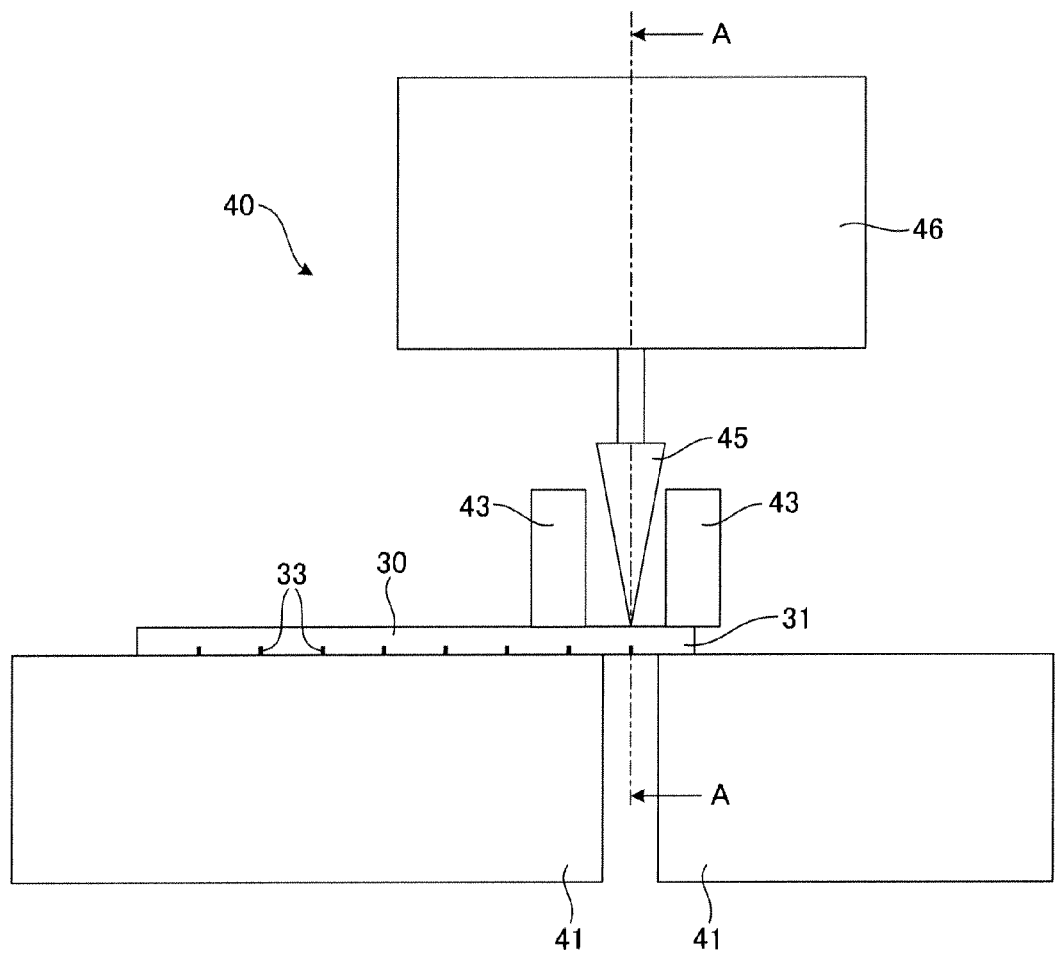
FIG. 3 is a schematic view illustrating a constitution of a magnet dividing jig for cleaving a magnet body.

FIG. 3 is one example of a magnet body cleaving device 40 for cleaving and dividing the magnet body 30 into a plurality of the magnet fragments 31. The magnet body 30 is fixed between a pair of dies 41 such that it is suspended between them, a punch 45 is dropped from above onto the portion that is suspended, and the magnet body 30 is cleaved by three-point bending. The magnet body cleaving device 40 includes a pair of dies 41 serving as a lower tool on which the magnet body 30 is mounted so as to be suspended between the dies 41, and magnet fixing jigs 43 that fix the magnet body 30 at the adjacent ends of the pair of dies 41. The magnet body cleaving device 40 also includes a punch 45 provided on an upper tool 46 that cleaves the magnet body 30 by pressing the suspended portion of the magnet body 30.

The magnet fixing jigs 43 fix the magnet body 30 by pressing it toward the edges of the pair of dies 41, and they press the magnet body 30 by fastening with bolts or by hydraulic or air pressure. The punch 45 cleaves the magnet body 30 along the notch grooves 33 of the magnet body 30 by pressing the portion of the magnet body 30 that is suspended between the pair of dies 41 downwards. The punch 45 is driven by, for example, a servo press, a mechanical press, a hydraulic press, or the like.

The magnet body cleaving device 40 has the above-described constitution, and the magnet body 30 provided with the grooves 33 is mounted so that it is suspended across the top surfaces of the pair of dies 41. The magnet body 30 is mounted on the pair of dies 41 such that the desired positions to be cleaved, or in other words the notch grooves 33 that were provided in advance on the surface to be cleaved are positioned on the side that faces the dies 41. The magnet body 30 is fixed by the magnet fixing jigs 43 in a state in which a notch groove 33 on the surface to be cleaved is positioned using, for example, a servo mechanism such that it is at the center of the suspended portion. The magnet body 30 is then broken and divided along the notch groove 33 by dropping the punch 45. Next, the fixation by the magnet fixing jigs 43 is released, and the magnet body 30 is conveyed by the length of one magnet fragment 31 (the distance between adjacent notch grooves 33). By repeating the above-described operation, the magnet body 30 is cleaved and divided into the plurality of magnet fragments 31.

Figure 14:
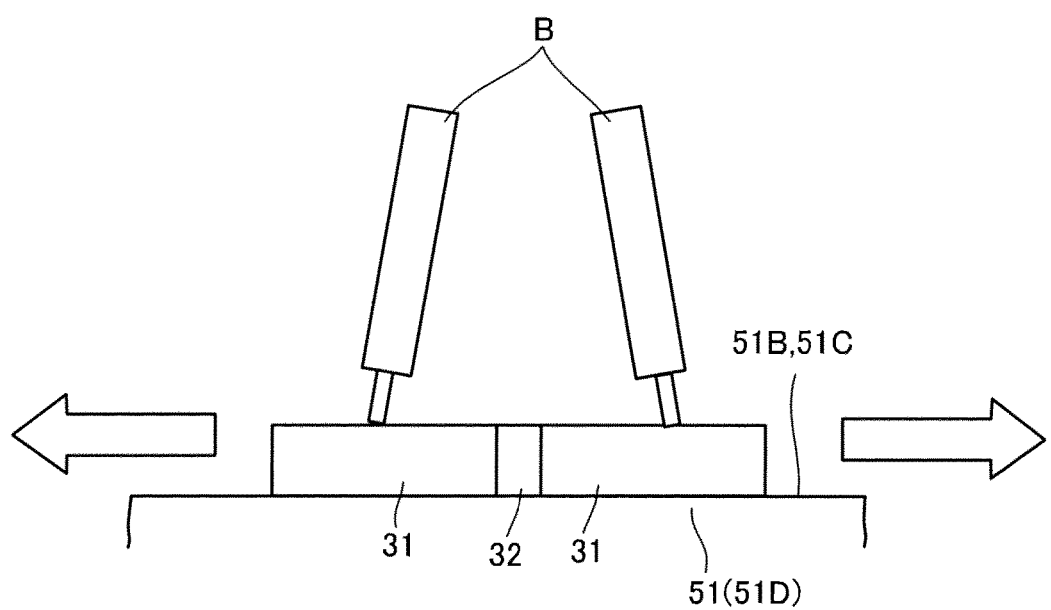
FIG. 14 is an explanatory view for explaining the state in a case that the operational axis lines of the pressing cylinders are not lined up.

As a method for integrating the plurality of cleaved magnet fragments 31 using a resin, mention may be made of, for example, a method in which the flat surfaces and side surfaces of each magnet fragment 31 are abutted against a reference jig, aligned and positioned by pressing with pressing means from the flat surfaces and the side surfaces, and then pressurized for adhesion from the lengthwise direction of alignment. However, there are cases in which a force may be applied in a direction that differs from the originally intended direction of pressurization for adhesion due to, for example, positional deviations, deformations, and the like of the pressing means that aligns and positions the magnet fragments 31 in the jig. FIG. 14 illustrates an example of the above-described case, and in a state in which the pressing directions of adjacent pressing means B are not lined up, a component force is generated in a direction that pulls the magnet fragments 31 apart. In such a case, a force is applied in a direction that differs from the originally intended direction of pressurization for adhesion, and this has led to problems in that the adhesive force between the magnet fragments 31 may become unstable and weak.

Thus, the present embodiment provides a manufacturing device and a manufacturing method for a field pole magnet body that includes an integrating device that integrates the magnet fragments 31 by pressing from the three directions of the thickness direction, the width direction, and the lengthwise direction (alignment direction) of the magnet fragments 31 to increase the alignment precision of the cleaved magnet fragments 31 to each other and suppress deviations thereof when bonding the magnet fragments 31 to each other with an adhesive.

Figure 4:
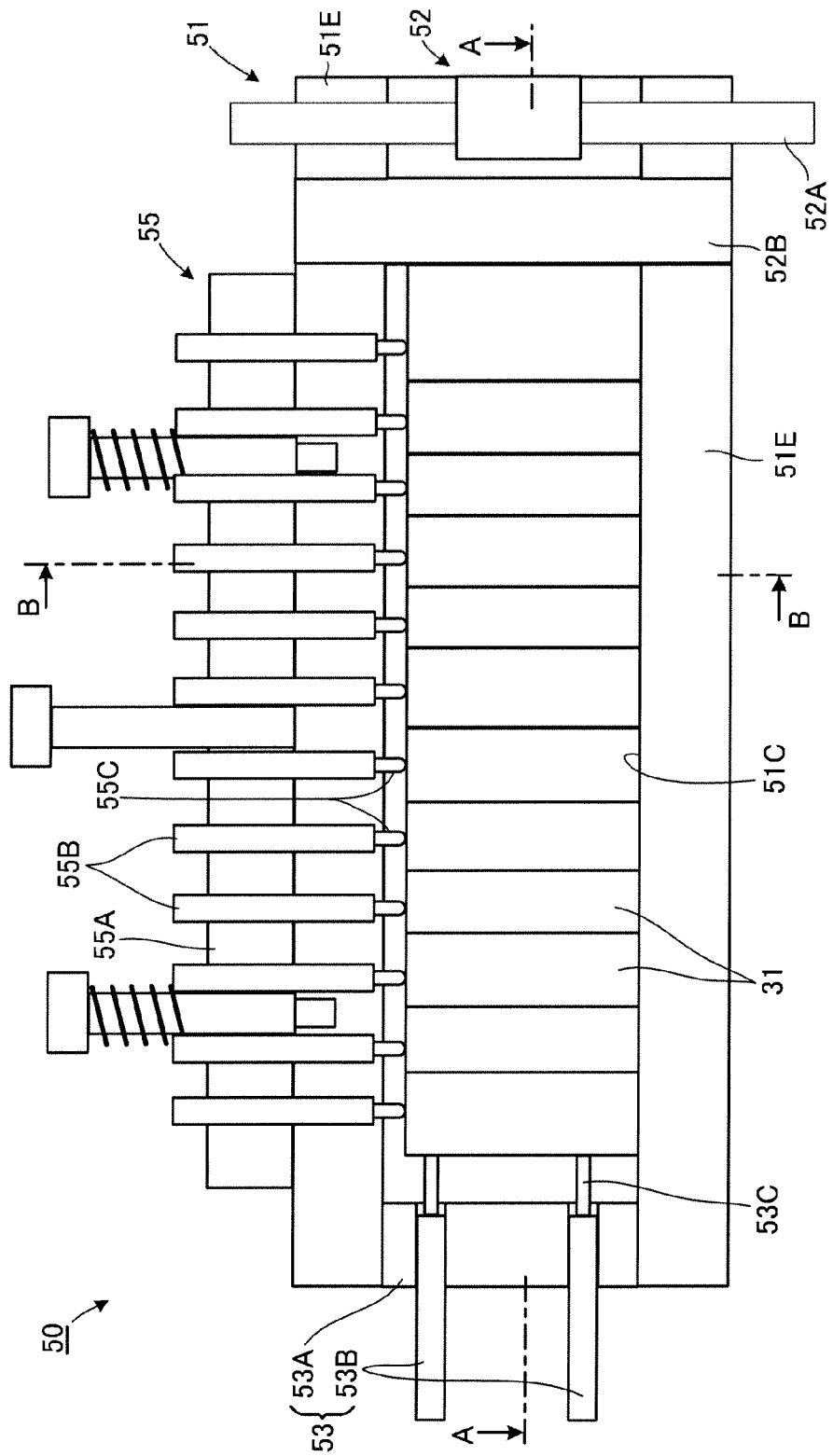
FIG. 4 is a plan view illustrating a constitution of an integrating device of a first embodiment.
Figure 5:
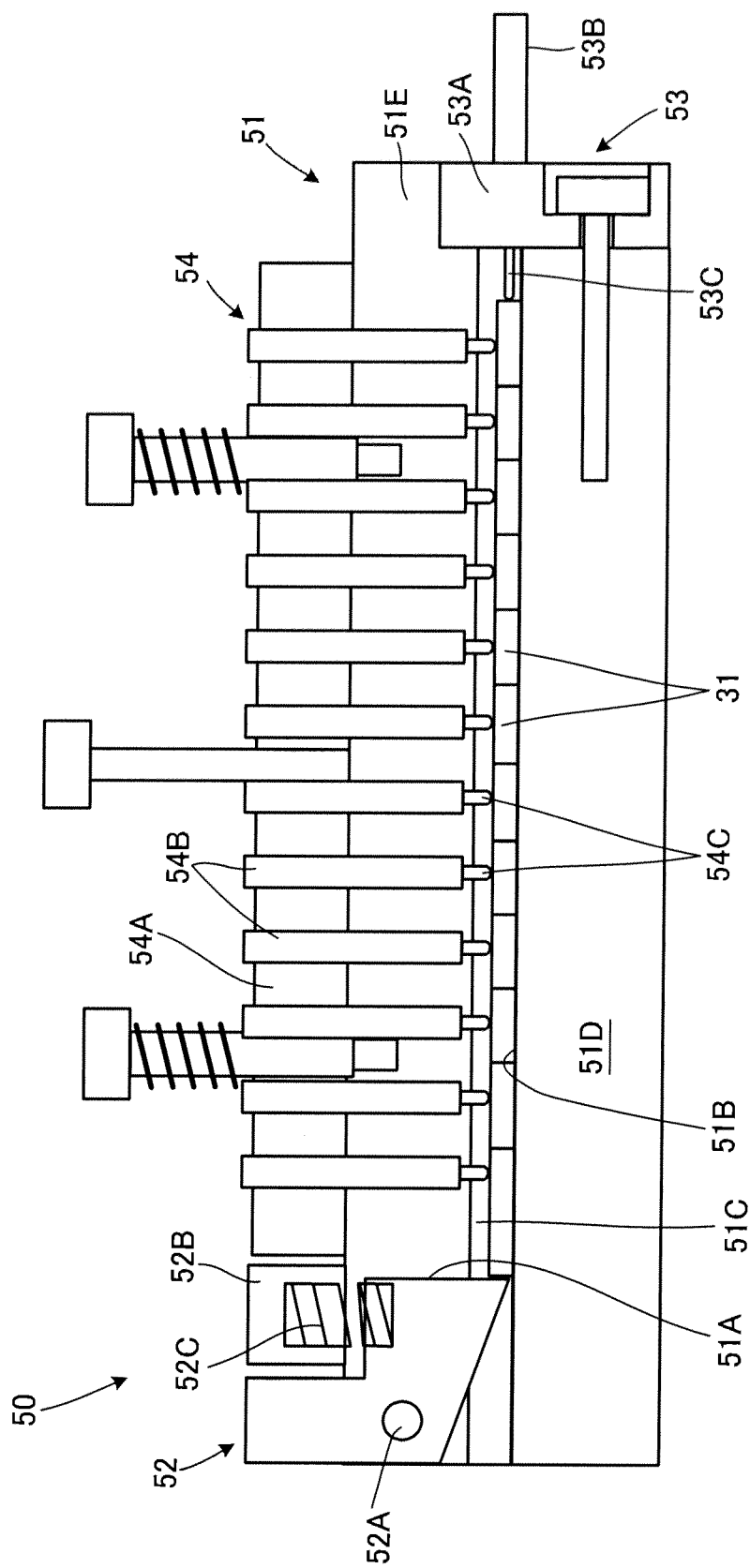
FIG. 5 is a cross-section view along line A-A of the integrating device shown in FIG. 4.
Figure 6:
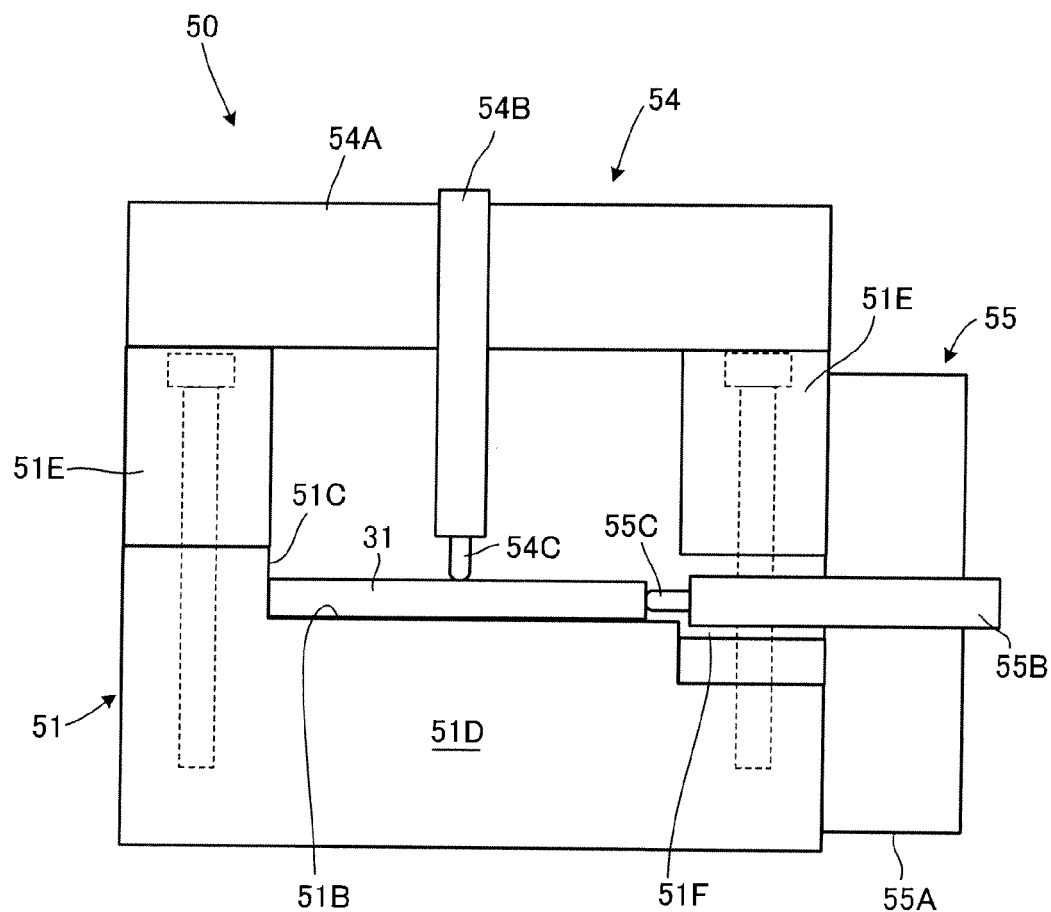
FIG. 6 is a cross-section view along line B-B of the integrating device shown in FIG. 4.

FIGS. 4 to 6 are respectively a front view, a side view, and a cross-section view illustrating the constitution of an integrating device 50 of the first embodiment that aligns and integrates the plurality of cleaved magnet fragments 31. The integrating device 50 includes a reference jig 51 that supports the plurality of magnet fragments 31 in the thickness direction and the width direction, and a pivoting pawl 52 including a lengthwise direction reference surface 51A that supports the magnet fragments 31 from the lengthwise direction. The integrating device 50 also includes a lengthwise direction pressing means 53 that presses the plurality of magnet fragments 31 toward the lengthwise direction reference surface 51A of the reference jig 51. The integrating device 50 further includes a thickness direction pressing means 54 that presses the plurality of magnet fragments 31 from the thickness direction to a thickness direction reference surface 51B of the reference jig 51, and a width direction pressing means 55 that presses the plurality of magnets 31 to a width direction reference surface 51C of the reference jig 51.

The reference jig 51 has a base side and two lateral sides, and is formed with a gutter-shaped cross-section in which the top surface is completely opened. The reference jig 51 is constituted by a main body 51D that has an L-shaped cross-section and forms the bottom side, and lateral side members 51E that are fixed on the top surface at both sides in the width direction of the main body 51D and form the two lateral sides. The thickness direction reference surface 51B that abuts one of the surfaces in the thickness direction of each of the plurality of magnet fragments 31 that are positioned and supported therein and the width direction reference surface 51C that protrudes from one side of the thickness direction reference surface 51B and abuts one of the surfaces in the width direction of each of the plurality of magnet fragments 31 are integrally formed in the main body 51D.

The pivoting pawl 52 is pivotably supported by a pin 52A which is supported at both ends on two lateral side members 51E, and the lengthwise direction reference surface 51A is formed by an inner wall surface of the pivoting pawl 52 within the reference jig 51. In the pivoting pawl 52, a portion supported by the pin 52A and a distal end pawl are offset in the lengthwise direction of the reference jig 51, and the distal end pawl is biased so that it contacts the thickness direction reference surface 51B by a spring 52C whose base is supported on a bridging member 52B that is fixed at both ends on the two lateral side members 51E. Therefore, in a state in which the distal end pawl is in contact with the thickness direction reference surface 51B, the magnet fragments 31 are positioned and supported from the lengthwise direction by the lengthwise direction reference surface 51A that is formed by a wall surface of the pivoting pawl 52 within the reference jig 51. If the distal end pawl is pivoted counter to the spring 52C so that it separates from the thickness direction reference surface 51B, a gap is formed between the tip of the pawl and the thickness direction reference surface 51B. The magnet fragments 31 can be pushed into the reference jig 51 through this gap.

The lengthwise direction pressing means 53 is arranged to oppose the lengthwise direction reference surface 51A at the other end in the lengthwise direction of the reference jig 51. The lengthwise direction pressing means 53 includes an attachment panel 53A that is fixed by a screw or the like to an end in the lengthwise direction of the reference jig 51 and a plurality of pressing cylinders 53B that are arranged and fixed so as to penetrate through the attachment panel 53A. The constitution of the pressing cylinders 53B will be explained later. A distal end of a piston rod 53C that protrudes from each pressing cylinder 53B is arranged so as to abut an end in the lengthwise direction of the magnet fragments 31 arranged within the reference jig 51, and is configured to press the magnet fragments 31 toward the lengthwise direction reference surface 51A.

Figure 11:
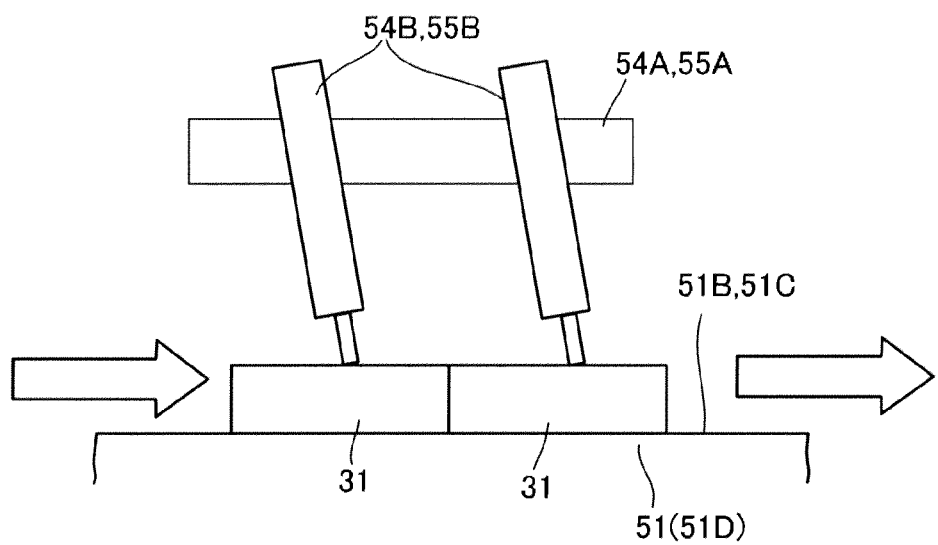
FIG. 11 is an explanatory view for explaining operational axis lines of the pressing cylinders.
Figure 12:
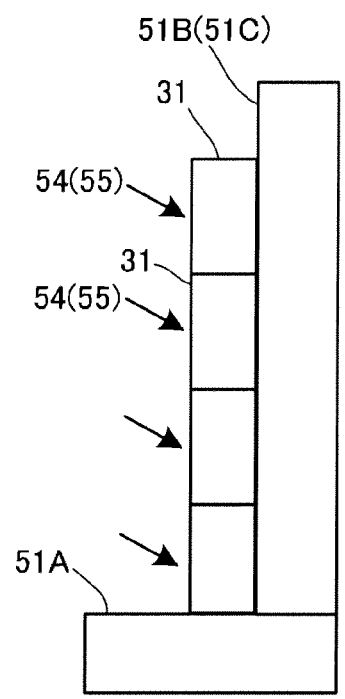
FIG. 12 is an explanatory view illustrating an operating state of the operational axis lines of the pressing cylinder on magnet fragments.

The thickness direction pressing means 54 is arranged to oppose the thickness direction reference surface 51B of the reference jig 51, and includes an attachment panel 54A that is fixed by a screw or the like to an opening that is opened in a gutter-shaped fashion of the reference jig 51 and a plurality of pressing cylinders 54B that are arranged and fixed so as to penetrate through the attachment panel 54A. The number of pressing cylinders 54B is configured to correspond to the number of magnet fragments 31 that are arranged within the reference jig 51. A tip of a piston rod 54C that protrudes from each pressing cylinder 54B is arranged so as to abut the thickness direction surface of each magnet fragment 31 arranged within the reference jig 51, and is configured to press the magnet fragment 31 toward the thickness direction reference surface 51B. As shown in FIGS. 11 and 12, the pressing cylinders 54B are fixed and arranged in the attachment panel 54A with their operational axis lines tilted so that they approach the lengthwise direction reference surface 51A at the tips of the piston rods 54C. The concrete constitution of the pressing cylinders 54B will be explained later.

The width direction pressing means 55 is arranged to oppose the width direction reference surface 51C of the reference jig 51, and includes an attachment panel 55A that is fixed by a screw or the like to a lateral side opposing the width direction reference surface 51C and a plurality of pressing cylinders 55B that are arranged and fixed so as to penetrate through the attachment panel 55A. The number of pressing cylinders 55B is configured to correspond to the number of magnet fragments 31 that are arranged within the reference jig 51. Each pressing cylinder 55B is arranged so as to penetrate through a through hole 51F provided on the lateral side member 51E. A tip of a piston rod 55C that protrudes from each pressing cylinder 55B is arranged so as to abut the width direction surface of each magnet fragment 31 arranged within the reference jig 51, and is configured to press the magnet fragment 31 toward the width direction reference surface 51C. As shown in FIGS. 11 and 12, the pressing cylinders 55B are fixed and arranged in the attachment panel 55A with their operational axis lines tilted so that they approach the lengthwise direction reference surface 51A at the tips of the piston rods 55C. The concrete constitution of the pressing cylinders 55B will be explained later.

Figure 7:
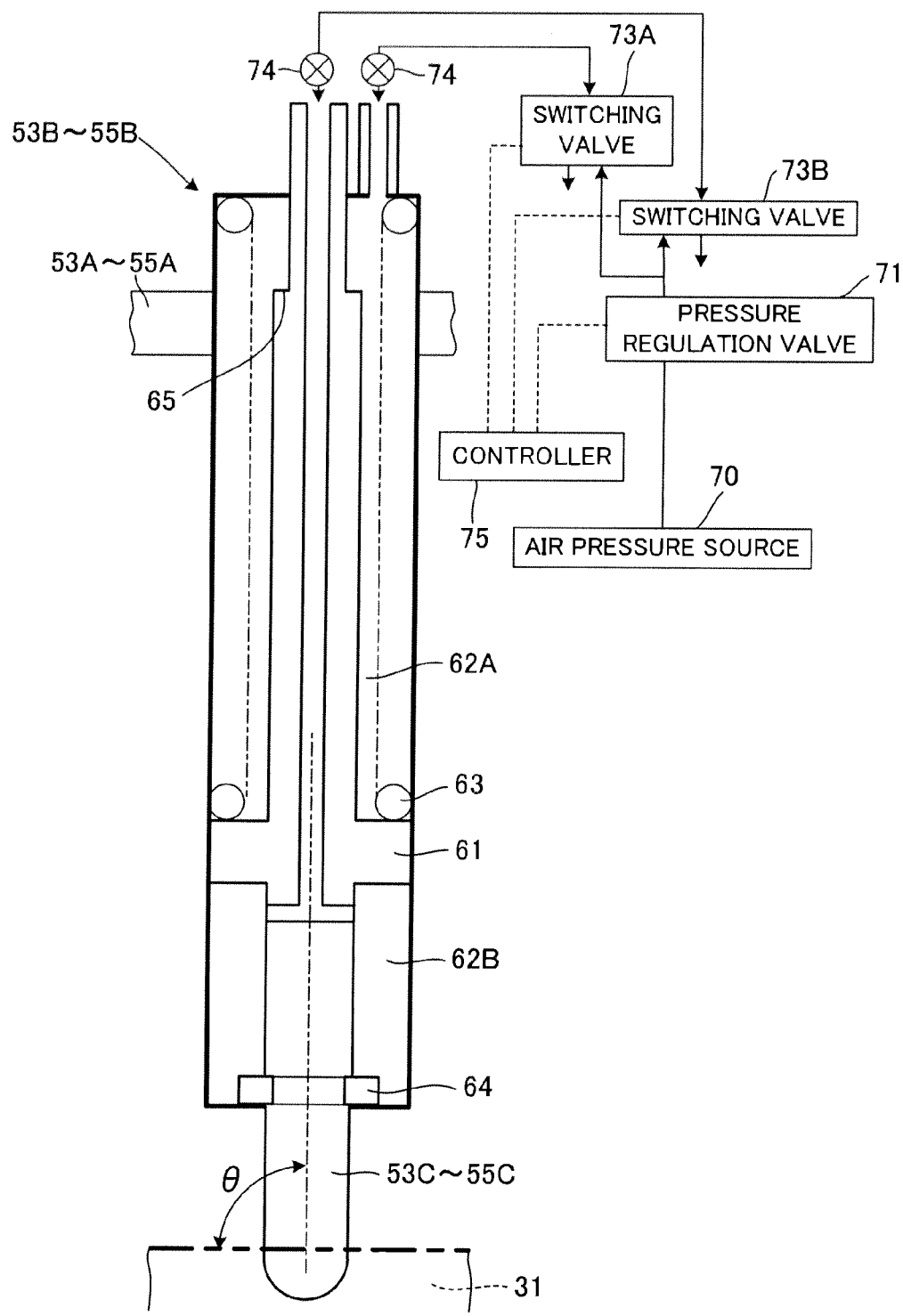
FIG. 7 is a schematic cross-section view of a pressing cylinder that constitutes pressing means for a thickness direction/width direction and a lengthwise direction.

As shown in FIG. 7, each pressing cylinder 53B-55B is formed by, for example, an air actuator. A compression spring 63 is built into a cylinder chamber 62A that is divided by a piston 61 of the actuator, and the piston rod 53C-55C is biased to be pushed out forward (downward direction in the drawing) via the piston 61 that slides within the cylinder. As illustrated in FIG. 7, in a state in which a magnet fragment 31 does not exist at the tip of the piston rod 53C-55C, the piston rod 53C-55C is pushed out until it is stopped by a stopper 64. Air pressure and atmospheric pressure that is regulated by a pressure regulation valve 71 can be selectively supplied from an air pressure source 70 via switching valves 73A and 73B to the cylinder chambers 62A and 62B that are divided by the piston 61. The pressure regulation value of the pressure regulation valve 71 and the switching operation of the switching valves 73A and 73B are controlled by a controller 75. The pipings between the switching valves 73A and 73B and the actuator are connected via connectors 74. By removing the connectors 74, the integrating device 50 can be independently transported, and can be transported by a transport apparatus to a heating furnace.

Figure 8:
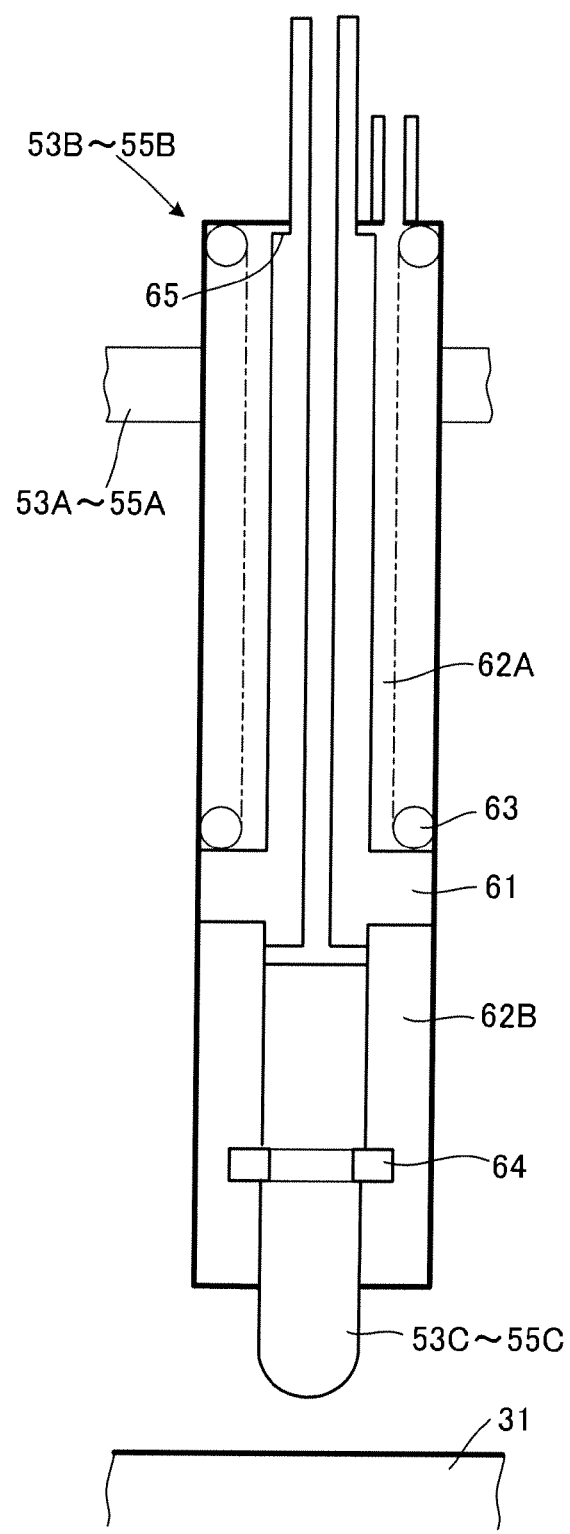
FIG. 8 is a cross-section view illustrating a contracted state of the pressing cylinder.
Figure 9:
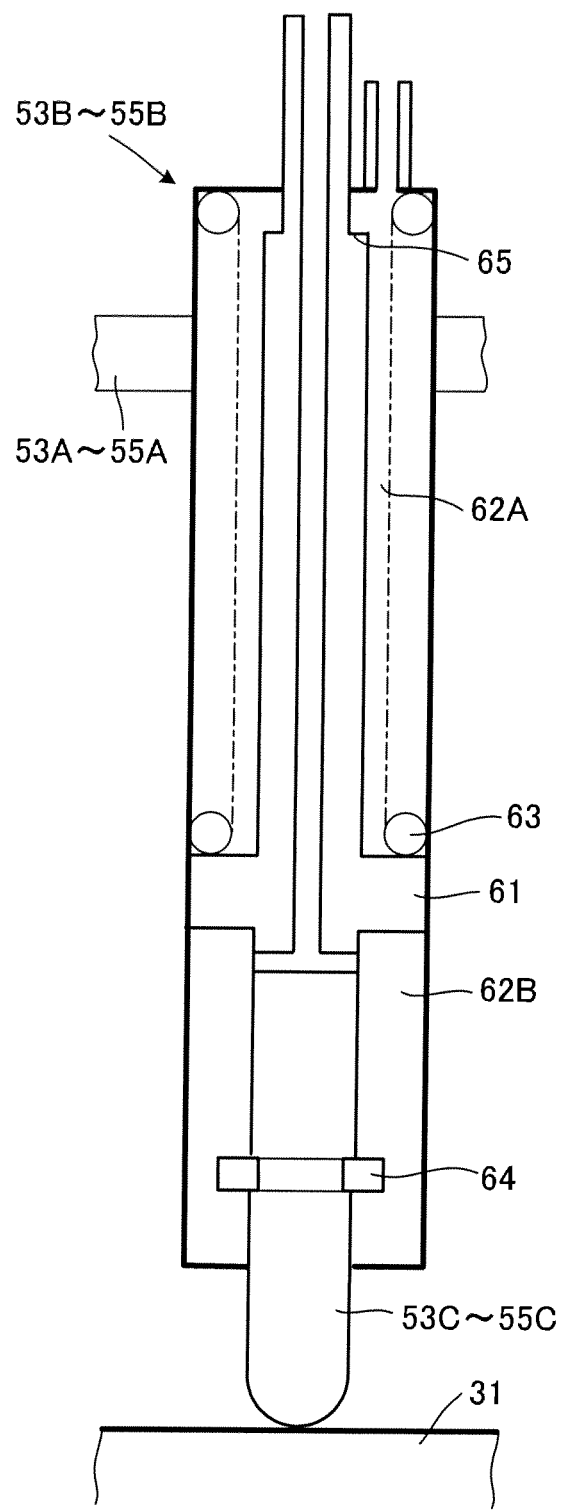
FIG. 9 is a cross-section view illustrating an operating state of the pressing cylinder.

Therefore, when air pressure is supplied via the switching valve 73B to a cylinder chamber 62B, the piston 61 is retracted counter to the compression spring 63 as shown in FIG. 8 so that the piston rod 53C-55C can be retracted until it is stopped by a stopper step 65. Further, if a magnet fragment 31 is arranged at the tip of the piston rod 53C-55C and air pressure is discharged from the cylinder chamber 62B, the piston rod 53C-55C in its retracted state is pushed out by the spring 63 so that its tip abuts the magnet fragment 31 as shown in FIG. 9. Therein, the piston rod 53C-55C can press the magnet fragment 31 by the biasing force of the spring 63. At this time, if air pressure at a pressure that counterbalances the biasing force of the spring 63 is supplied into the cylinder chamber 62B, the pressing force against the magnet fragment 31 can be released to zero in a state in which the tip of the piston rod 53C-55C abuts the magnet fragment 31. Further, if pressure-regulated air pressure is supplied to the cylinder chamber 62A, a biasing force by the air pressure is added to the pressing force by the spring 63 so that the magnet fragment 31 can be pressed.

Figure 10:
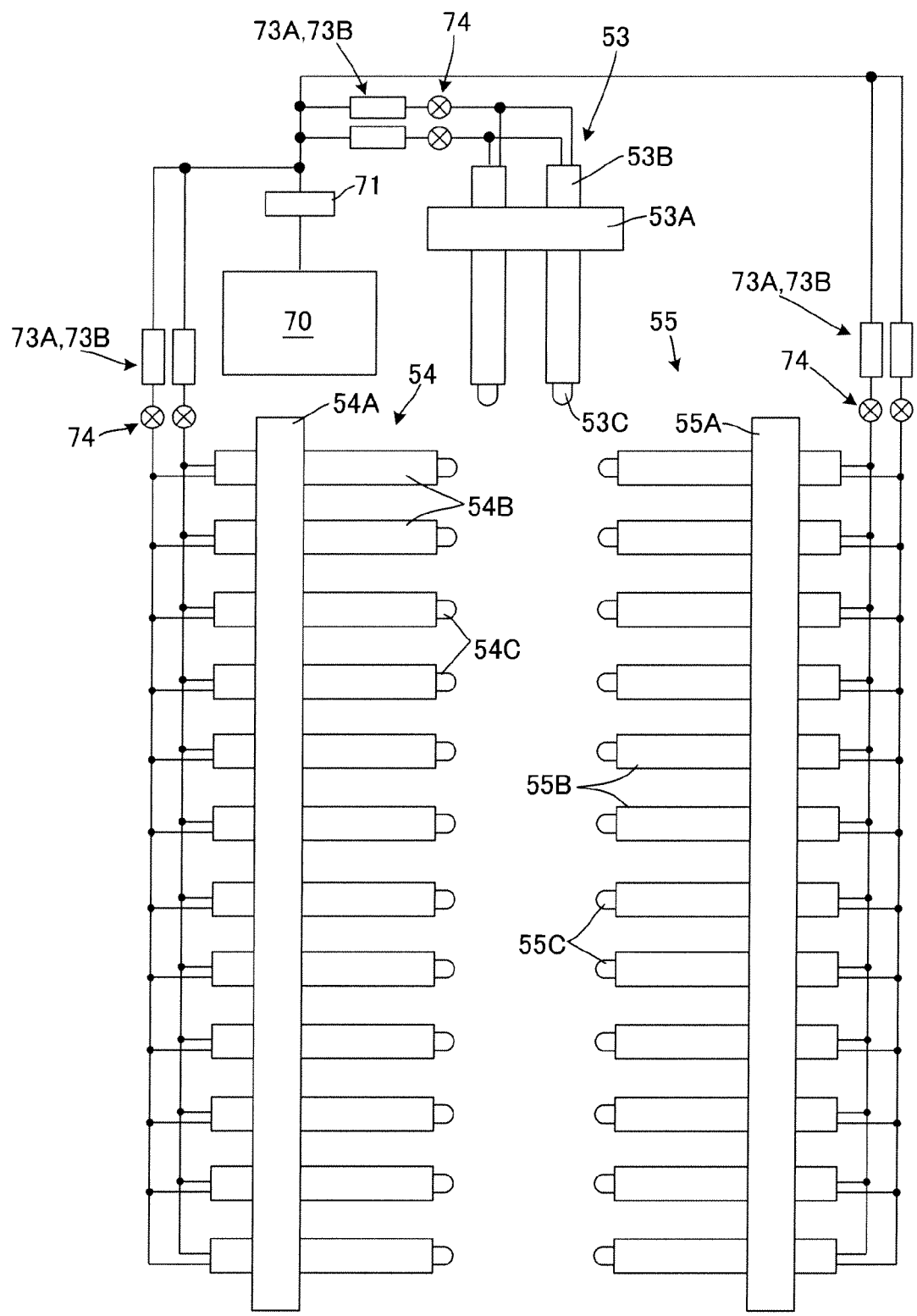
FIG. 10 is an explanatory view illustrating air pressure piping to each pressing cylinder.

FIG. 10 illustrates air pressure piping to the lengthwise direction pressing cylinders 53A, the thickness direction pressing cylinders 53B, and the width direction pressing cylinders 53C. As shown in FIG. 10, common piping for the lengthwise direction pressing cylinders 53A, the thickness direction pressing cylinders 53B, and the width direction pressing cylinders 53C is connected to the switching valves 73A and 73B via the connectors 74. Pressure-regulated air pressure is supplied from the air pressure source 70 to the switching valves 73A and 73B via the pressure regulation valve 71. As described above, the switching position and pressure regulation value of the switching valves 73A and 73B and the pressure regulation valve 71 are controlled by the input of switching signals and pressure regulation signals from the controller 75.

Next, the method for aligning and integrating the plurality of cleaved magnet fragments 31 with the device 50 for integrating the field pole magnet body constituted as described above will now be explained.

First, air pressure is supplied to the cylinder chamber 62B of each pressing cylinder 53B-55B of the lengthwise direction pressing means 53, thickness direction pressing means 54, and width direction pressing means 55 of the integrating device 50 of FIGS. 4 to 6 so as to retract each piston rod 53C-55C of each pressing cylinder 53B-55B. Next, the magnet fragments 31, which have been cleaved and an adhesive has been applied to the cleaved surfaces thereof, are aligned in the order in which they were cleaved along the width direction reference surface 51C and the thickness direction reference surface 51B from the outside in the lengthwise direction of the integrating device 50, and then pushed into the integrating device 50 from the outside of the distal end of the pivoting pawl 52 that includes the lengthwise direction reference surface 51A. The distal end of the pivoting pawl 52 that includes the lengthwise direction reference surface 51A is abutted to the thickness direction reference surface 51B of the integrating device 50 by the spring 52C. Therefore, the pivoting pawl 52 pivots counter to the spring 52C due to the magnet fragments 31 being pushed in so as to disengage the pawl distal end from the thickness direction reference surface 51B, and thereby a gap is formed between the pawl distal end and the thickness direction reference surface 51B. The magnet fragments 31 can then be inserted into the integrating device 50 through the gap between the pawl distal end and the thickness direction reference surface 51B.

When a final magnet fragment 31 of a predetermined number is inserted into the integrating device 50 by a pushing rod or the like (not illustrated), once the lengthwise direction surface at the rear of the final magnet fragment 31 passes the distal end of the pivoting pawl 52, the pivoting pawl 52 pivots by the spring 52C so that its distal end abuts the thickness direction reference surface 51B. In this state, the lengthwise direction surface at the forward side of the foremost magnet fragment 31 abuts or faces the tip of the piston rod 53C of the pressing cylinder 53B of the lengthwise direction pressing means 53. The lengthwise direction surface at the rear of the final magnet fragment 31 passes the distal end of the pivoting pawl 52 so that a pre-set interval opens between it and the lengthwise direction reference surface 51A of the pivoting pawl 52.

Next, each piston rod 53C is pushed out by the spring 63 by releasing the air pressure within the cylinder chamber 62B of each pressing cylinder 53B of the lengthwise direction pressing means 53. The tip of each piston rod 53C abuts the lengthwise direction surface of the magnet fragment 31 at the end to press/move the magnet fragments 31 arranged in the lengthwise direction toward the lengthwise direction reference surface 51A in order to position the magnet fragments 31 at a predetermined position in the lengthwise direction within the reference jig 51. The magnet fragments 31 are aligned with their cleaved surfaces contacting each other by the biasing force of the springs 63 that are built into the lengthwise direction pressing means 53.

Next, air pressure within the cylinder chamber 62B of each pressing cylinder 54B of the thickness direction pressing means 54 is released, and air pressure is supplied into the cylinder chamber 62A to push out the piston rod 54C. The tip of each piston rod 54C contacts the thickness direction surface of each magnet fragment 31 and presses each magnet fragment 31 to the thickness direction reference surface 51B to position each magnet fragment 31 in the thickness direction. During this positioning, the cleaved surfaces of the magnet fragments 31 are contacted to each other by the lengthwise direction pressing means 53, but this pressing force by the springs 63 is relatively weak. Therefore, the thickness direction position of each magnet fragment 31 is modified corresponding to the biasing force of the springs 63 of the thickness direction pressing means 54 and a positional correction in the thickness direction by air pressure. Further, the operational axis lines of the pressing cylinders 54B of the thickness direction pressing means 54 are tilted so that they approach the lengthwise direction reference surface 51A at the tip side of the pressing cylinders 54B, and thus a component force toward the lengthwise direction reference surface 51A is added to each magnet fragment 31. This component force presses each magnet fragment 31 toward the lengthwise direction reference surface 51A. As a result, the contact pressure between the cleaved surfaces of the magnet fragments 31 increases and in turn the contact force between the magnet fragments increases.

Next, air pressure within the cylinder chamber 62B of each pressing cylinder 55B of the width direction pressing means 55 is released, and air pressure is supplied into the cylinder chamber 62A to push out the piston rod 55C. The tip of each piston rod 55C contacts the width direction surface of each magnet fragment 31 and presses each magnet fragment 31 to the width direction reference surface 51C to position each magnet fragment 31 in the width direction. During this positioning, the cleaved surfaces of the magnet fragments 31 are contacted to each other by the lengthwise direction pressing means 53, but the width direction position of each magnet fragment 31 is modified corresponding to the biasing force of the springs 63 of the width direction pressing means 55 and a positional correction in the width direction by air pressure. Further, the operational axis lines of the pressing cylinders 55B of the width direction pressing means 55 are tilted so that they approach the lengthwise direction reference surface 51A at the tip side of the pressing cylinders 55B, and thus a component force toward the lengthwise direction reference surface 51A is added to each magnet fragment 31. This component force presses each magnet fragment 31 toward the lengthwise direction reference surface 51A. As a result, the contact pressure between the cleaved surfaces of the magnet fragments 31 increases and in turn the contact force between the magnet fragments increases.

Thereby, the cleaved surfaces which face each other of the cleaved magnet fragments 31 are pressed by the lengthwise direction pressing means 53 in a state in which an adhesive is interposed therebetween, and they contact each other in a state in which lengthwise direction component forces of pressing forces generated by the thickness direction and width direction pressing means 54 and 55 act on the magnet fragments 31. The adhesive that is interposed between the cleaved surfaces spreads out appropriately between the cleaved surfaces due to the above-mentioned pressing forces, and thus the adhesive force can be ensured. Further, the magnet fragments 31 are aligned with each other in the thickness direction and the width direction, and are bonded to each other with the adhesive interposed therebetween in a state in which irregularities between the cleaved surfaces are matched up to each other. Therefore, the magnet fragments 31 are adhered to each other such that the thickness of the adhesive is the same in every region of the cleaved surfaces.

As described above, either one or both of the thickness direction pressing means 54 and the width direction pressing means 55 adds a component force toward the lengthwise direction reference surface 51A to each magnet fragment 31 by tilting the operational axis lines thereof so that they approach the lengthwise direction reference surface 51A at the tip side of the pressing cylinders. The component force presses the magnet fragments 31 toward the lengthwise direction reference surface 51A. As a result, the contact pressure between the cleaved surfaces of the magnet fragments 31 increases and in turn the contact force between the magnet fragments increases. Therefore, the pressing functioning of the lengthwise direction pressing means 53 can be reduced. For example, the lengthwise direction pressing means 53 can include only a function for filling the gaps between the magnet fragments 31 with only the springs 63. It is also unnecessary to load a forced biasing force by an actuator or the like in the lengthwise direction, and the process of pressing in the lengthwise direction can be eliminated.

Next, air pressure within the cylinder chambers 62A of the thickness direction pressing means 54 and the width direction pressing means 55 is released. The magnet fragments 31 are maintained in a state in which they are positioned in the width direction and the thickness direction by the biasing force of the springs 63 of the thickness direction pressing means 54 and the width direction pressing means 55. In addition to the biasing force of the springs 63 of the lengthwise direction pressing means 53 in the lengthwise direction of the magnet fragments 31, the magnet fragments 31 are also positioned in the lengthwise direction by the lengthwise direction components forces of the biasing forces by the springs 63 of the thickness direction pressing means 54 and the width direction pressing means 55. Thereby, the magnet fragments 31 are maintained in a state in which the contact pressure between their cleaved surfaces is increased.

Next, the connectors 74 of the air pressure piping to the lengthwise direction, width direction, and thickness direction pressing means 53 to 55 are removed so that the integrating device 50 in which the plurality of magnet fragments 31 are positioned and retained can be transported. The integrating device 50 in which the plurality of magnet fragments 31 are positioned and retained is then transported to a heating furnace and passed through the heating furnace to raise the temperature to, for example, 150° C. in order to cure the adhesive.

Dimensional changes in the lamination direction of the magnet fragments 31 occur due to thermal expansion during curing of the adhesive by raising the temperature and decreases in the viscosity of the adhesive caused by raising the temperature. However, since the thickness direction and width direction pressing means 54 and 55 press the magnet fragments 31 with a pre-set pressing force by the springs 63 so as to allow movement in the lengthwise direction of the magnet fragments 31, they track the movement due to the deformation of the springs 63 that press and support the piston rods 53C of the lengthwise direction pressing means 53. Therefore, decreases in the adhesive force between the magnet fragments 31 can be suppressed, and a uniform adhesive force between the magnet fragments 31 can be achieved. As a result, the clearance between the magnet fragments 31 can be uniformly controlled without breaking the spacers blended into the adhesive, and the overall length dimension of the field pole magnet body 80 can be contained within a desired dimension (standard).

Subsequently, the lengthwise direction, thickness direction, and width direction pressing means 53 to 55 are removed from the reference jig 51 and the integrated magnet body 30 is extracted from the reference jig 51, and thereby the field pole magnet body 80 can be formed.

If the grooves 33 provided in advance for cleaving the magnet body 30 are created by laser processing, protrusions in the thickness direction are formed along the cleaved surfaces of the magnet fragments 31. In a laser beam irradiation method, the tip at the end of each notch groove 33 can be sharpened, and the equipment used therein and the running costs are inexpensive. However, in such a laser beam irradiation method, the material that constitutes the volume of each groove 33 formed on the magnet surface, or in other words the material in a region that is melted as each notch groove 33 is displaced to both sides of the notch groove 33 and accumulates and adheres thereto. Thus, burrs (protrusions) are ultimately formed on the magnet surface on both sides of the notch groove 33 by the material that has accumulated and adhered.

In the thickness direction pressing means 54 of the present embodiment, the magnet fragments 31 are pressed at the center of the thickness direction surface of each magnet fragment 31 toward the thickness direction reference surface 51B of the reference jig 51 by the tips of the piston rods 54C of the pressing cylinders 54B. Therefore, the magnet fragments 31 can be pressed while avoiding any burrs formed on the surface of the magnet fragments 31 at both sides of each notch groove 33. Thus, the magnet fragments 31 can be aligned without any deviations in the thickness direction between the magnet fragments 31 and the thickness direction reference surface 51B of the reference jig 51. Further, expansion and the like that occurs during spreading of the adhesive and curing of the adhesive as well as lengthwise direction movement of the magnet fragments 31 when the magnet fragments 31 are pressed from the lengthwise direction by the lengthwise direction pressing means 53 can be permitted without any interference from such protrusions.

Protrusions on the surface of the field pole magnet body 80 are removed all at once by mechanical processing after curing of the adhesive. In this way, removing any protrusions after the magnet fragments 31 have been integrated into the field pole magnet body 80 enables easy improvement of the shaping precision of the field pole magnet body 80 compared to a case in which protrusions are removed from each individual magnet body 31 to adjust its shape before integration. Further, this also enables a large field pole magnet body 80 to be produced, and as a result it contributes to improving the motor output.

As described above, by pressing the cleaved and divided magnet fragments 31 from the three directions of the thickness direction, the width direction, and the lengthwise direction with the integrating device 50, the magnet fragments 31 can be integrated with the adhesive to form the field pole magnet body 80 in a state in which any deviations between the cleaved magnet fragments 31 have been suppressed. Therefore, when assembling the field pole magnet bodies 80 into the slots 22 of the rotor core 21, a defect in which the magnet fragments 31 that constitute the field pole magnet body 80 catch onto the edges of the slot 22 of the rotor core 21 such that the field pole magnet body 80 cannot be assembled is prevented. In other words, deviations between the magnet fragments 31 can be suppressed, and thus the defect rate of defective articles that occur when the field pole magnet body 80 cannot be inserted into the slot 22 of the rotor core 21 due to deviations between the magnet fragments 31 can be improved, which in turn leads to improvements in the yield.

In addition, the magnet dimensions of the field pole magnet body 80 can be formed to be the same size as the inner dimensions of the slot 22 of the rotor core 21, and thus a large field pole magnet body 80 can be produced compared to a case in which a field pole magnet body 80 having deviations between the magnet fragments 31 is inserted. Thereby, the motor output can be improved.

In the above-described embodiment, the magnet fragments 31 which have been arranged are pressed toward the thickness direction reference surface 51B by the thickness direction pressing means 54 and then pressed toward the width direction reference surface 51C by the width direction pressing means 55. However, the pressing order is not limited to the above-described order, and the magnet fragments 31 can be pressed toward the thickness direction reference surface 51B by the thickness direction pressing means 54 after pressing them toward the width direction reference surface 51C by the width direction pressing means 55.

Further, in the above-described embodiment, the operational axis lines of both the width direction pressing means 55 and the thickness direction pressing means 54 are tilted when fixing and arranging them on the attachment panels 54A and 55A. However, it is also possible to tilt the operational axis lines of only one of the width direction pressing means 55 and the thickness direction pressing means 54 when fixing and arranging them on the attachment panels 54A and 55A.

Also, in the above-described embodiment, as a method for arranging the magnet fragments 31 in the integrating device 50, the magnet fragments 31 are inserted upon pivoting the pivoting pawl 52 that constitutes the lengthwise direction reference surface 51A from behind the pivoting pawl 52. However, the method for arranging the magnet fragments 31 is not limited to that described above. For example, it is also possible to form the lengthwise direction reference surface 51A with a simple wall surface, and then when inserting the magnet fragments 31, the thickness direction pressing means 54 is removed from the reference jig 51 and the plurality of magnet fragments 31 are inserted and arranged in the reference jig 51 from the opening that is opened. In this case, the thickness direction pressing means 54 is subsequently reattached to the reference jig 51, and then the pressing means 53 to 55 are operated in the same order as described above to integrate the plurality of magnet fragments 31.

Further, in the above-described embodiment, pressing means that extended and contracted the piston rods 53C to 55C by the springs 63 and air pressure were used as the lengthwise direction, thickness direction, and width direction pressing means 53 to 55. However, the pressing means are not limited to such a constitution. For example, it is also possible to constitute the pressing means by providing a rod that freely extends/contracts from the cylinder, connecting a spring at the base of the rod, enabling the base position of the spring to be moved in the cylinder axial direction by a screw, and then adjusting the tightening position of the screw by a servo motor or the like. In this method, the rod can be retracted by loosening the screw to retract the base position of the spring, and the rod can be advanced by tightening the screw to move the base position of the spring forward. Moreover, by further tightening the screw in a state in which the tip of the rod abuts the magnet fragment, the pressing force on the magnet fragment can also be adjusted.

In the present embodiment, the following effects are achieved.

(A) The manufacturing device for a field pole magnet body 80 to be installed in a rotating electric machine A manufactures the field pole magnet body 80 by aligning a plurality of magnet fragments 31 formed by cleaving and dividing a magnet body 30 in the width direction and then bonding the magnet fragments 31 to each other. To do so, the manufacturing device for the field pole magnet body 80 has a reference jig 51 that includes lengthwise direction, thickness direction, and width direction reference surfaces 51A to 51C for positioning the plurality of cleaved and divided magnet fragments 31 in an aligned state with their cleaved surfaces facing each other. In addition, the manufacturing device for the field pole magnet body 80 also includes a first pressing means 54 that presses the plurality of magnet fragments 31 from the thickness direction of the magnet body 30 to the thickness direction reference surface 51B in order to align them in the thickness direction, and a second pressing means 55 that presses the plurality of magnet fragments 31 from the width direction of the magnet body 30 to the width direction reference surface 51C in order to align them in the width direction. Further, at least one of the first and second pressing means 54 and 55 is configured such that the operational axis lines of its pressing cylinders 54B and 55B which serve as a pressing part are tilted such that they approach the lengthwise direction reference surface 51A at the side that abuts the magnet fragments 31.

Therefore, in both or either one of the width direction pressing means 55 and the thickness direction pressing means 54, the operational axis lines are tilted so that they approach the lengthwise direction reference surface 51A at the tip side thereof. Thereby, a component force toward the lengthwise direction reference surface 51A is added to the magnet fragments 31. This component force presses the magnet fragments 31 toward the lengthwise direction reference surface 51A. As a result, the contact pressure between the cleaved surfaces of the magnet fragments 31 increases, and in turn the contact force between the magnet fragments can be increased and the adhesive force between the magnet fragments 31 can be stabilized.

Further, the pressing functioning of the lengthwise direction pressing means 53 can be reduced. For example, the lengthwise direction pressing means 53 can include only a function for filling the gaps between the magnet fragments 31 with only the springs 63. It is also unnecessary to load a forced biasing force by an actuator or the like in the lengthwise direction, and the process of pressing in the lengthwise direction can be eliminated.

(Second Embodiment)

Figure 13:
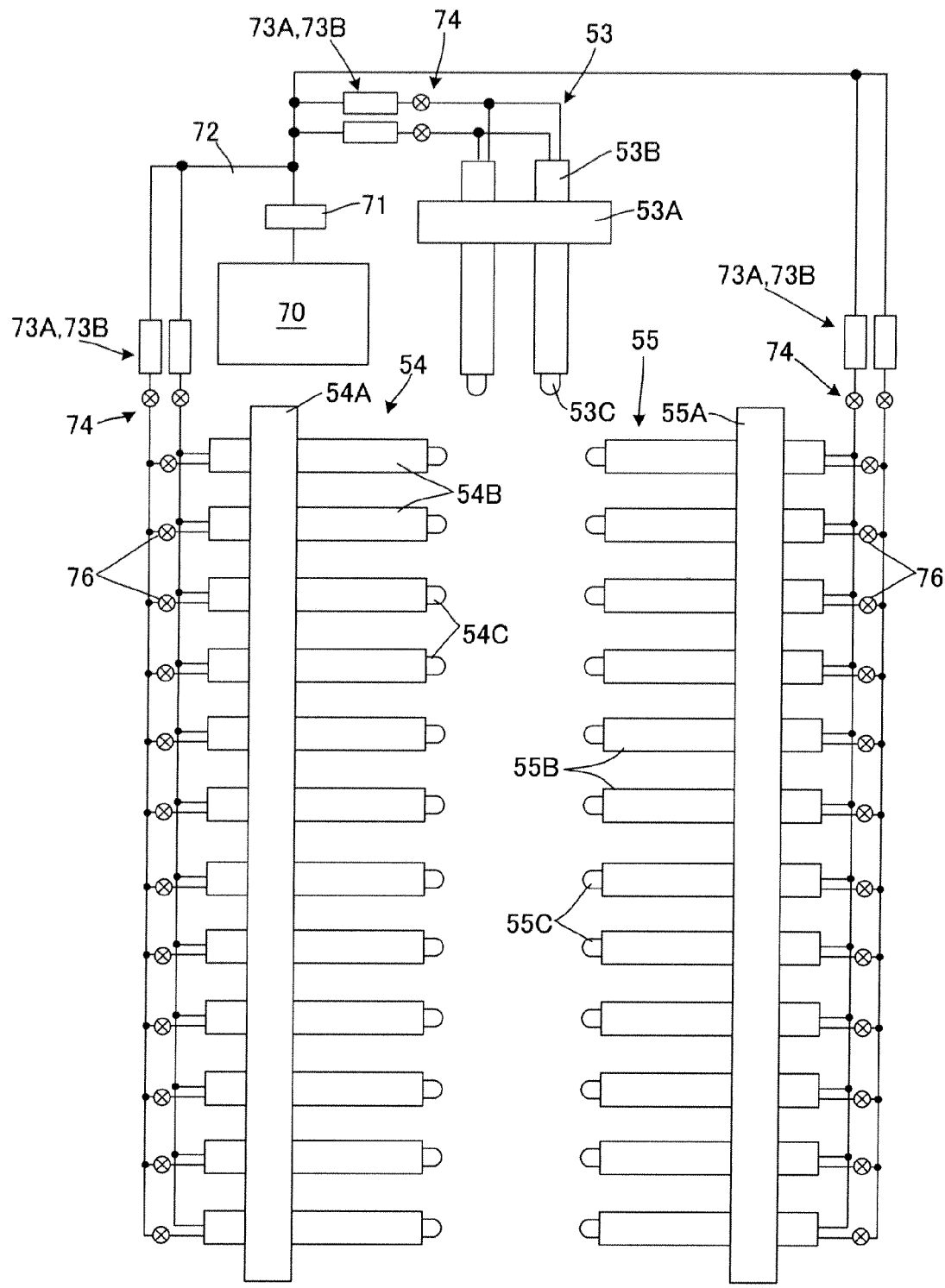
FIG. 13 is an explanatory view illustrating air pressure piping to each pressing cylinder of an integrating device of a second embodiment.

FIG. 13 is schematic constitutional view illustrating air pressure piping of an integrating device for a field pole magnet body in a second embodiment of the manufacturing device and manufacturing method for a field pole magnet body to which the present invention is applied. In the present embodiment, a constitution is added to the first embodiment in which the pressing operations of the thickness direction pressing means and the width direction pressing means are first applied to the magnet fragment on the side near the lengthwise direction reference surface, and then applied sequentially to each magnet fragment moving away from the lengthwise direction reference surface. The same reference numerals will be assigned to those devices which are identical to the first embodiment, and explanations thereof will be omitted or simplified.

In the air pressure piping of the integrating device 50 for the field pole magnet body in the present embodiment shown in FIG. 13, in addition to the air pressure piping of the integrating device 50 of the first embodiment shown in FIG. 10, cutoff valves 76 are further provided to the air piping to each of the cylinder chambers 62A of the pressing cylinders 54B and 55B. The opening/closing operation of the cutoff valves 76 is controlled by the controller 75. The other constitutions are the same as in the first embodiment.

The method for aligning and integrating the plurality of cleaved magnet fragments 31 by the integrating device 50 for a field pole magnet body of the present embodiment will now be explained below.

First, the piston rods 53C to 55C of the pressing cylinders 53B to 55B of the lengthwise direction pressing means 53, the width direction pressing means 55, and the thickness direction pressing means 54 of the integrating device 50 are retracted, and then the magnet fragments 31, which have been cleaved and an adhesive has been applied to the cleaved surfaces thereof, are set in the integrating device 50 in the order in which they were cleaved. Next, the cutoff valves 76 provided on the air piping to the cylinder chambers 62A of the pressing cylinders 54B and 55B of the width direction pressing means 55 and the thickness direction pressing means 54 are engaged into a cutoff state.

Next, the piston rods 53C are pushed out by the springs 63 by releasing the air within the cylinder chambers 62B of the pressing cylinders 53B of the lengthwise direction pressing means 53. The magnet fragments 31 arranged in the lengthwise direction are pressed and moved toward the pivoting pawl 52 of the lengthwise direction reference surface 51A by the piston rods 53C that have been pushed out, and then positioned at a predetermined position in the lengthwise direction within the reference jig 51. The magnet fragments 31 are aligned with their cleaved surfaces contacting each other by the biasing force of the springs 63 that are built into the lengthwise direction pressing means 53.

Next, air pressure within the cylinder chambers 62B of the pressing cylinders 54B and 55B of the thickness direction pressing means 54 and the width direction pressing means 55 is released, and air pressure is supplied into the cylinder chambers 62A of the thickness direction pressing means 54 and the width direction pressing means 55. The pressing cylinders 54B and 55B of the thickness direction pressing means 54 and the width direction pressing means 55 cutoff the supply of air pressure to the cylinder chambers 62A with the cutoff valves 76. Thereby, the tips of the piston rods 54C and 55C do not contact the magnet fragments 31 and the piston rods 54C and 55C are stopped in a retracted position.

Next, the cutoff valves 76 provided to the pressing cylinders 54B and 55B of the thickness direction pressing means 54 and the width direction pressing means 55 that have the piston rods 54C and 55C whose tips are opposing the first magnet fragment 31 abutting the lengthwise direction reference surface 51A are opened. By opening these cutoff valves 76, the locked state of the pressing means is released, and the piston rods 54C and 55C are pushed out by the biasing force of the built-in springs 63 and the supply of air pressure to the cylinder chambers 62A. Due to the extension of the piston rods 54C and 55C of the thickness direction pressing means 54 and the width direction pressing means 55, the tips of the piston rods 54C and 55C contact the thickness direction surface and the width direction surface of the magnet fragment 31. The magnet fragment 31 is then pressed to the thickness direction reference surface 51B and the width direction reference surface 510 to position it in the thickness direction and the width direction.

By tilting the operational axis lines of the pressing cylinders 54B and 55B of the thickness direction pressing means 54 and the width direction pressing means 55 so that they approach the lengthwise direction reference surface 51A at the tip side of the pressing cylinders, component forces toward the lengthwise direction reference surface 51A are added to the magnet fragment 31. These component forces press the magnet fragment 31 toward the lengthwise direction reference surface 51A. As a result, the magnet fragment 31 can be accurately positioned at the lengthwise direction reference surface 51A.

Next, the cutoff valves 76 provided to the pressing cylinders 54B and 55B of the thickness direction pressing means 54 and the width direction pressing means 55 that have the piston rods 54C and 55C whose tips are opposing the second magnet fragment 31 whose cleaved surface is in contact with the cleaved surface of the first magnet fragment 31 are opened. By opening these cutoff valves 76, the locked state of the pressing means 54 and 55 is released, and the piston rods 54C and 55C are pushed out by the biasing force of the built-in springs 63 and the supply of air pressure to the cylinder chambers 62A. Due to the extension of the piston rods 54C and 55C of the thickness direction pressing means 54 and the width direction pressing means 55, the tips of the piston rods 54C and 55C contact the thickness direction surface and the width direction surface of the magnet fragment 31. The magnet fragment 31 is then pressed to the thickness direction reference surface 51B and the width direction reference surface 51C to position it in the thickness direction and the width direction.

By tilting the operational axis lines of the pressing cylinders 54B and 55B of the thickness direction pressing means 54 and the width direction pressing means 55 so that they approach the lengthwise direction reference surface 51A at the tip side of the pressing cylinders, component forces toward the lengthwise direction reference surface 51A are added to the magnet fragment 31. These component forces press the magnet fragment 31 toward the lengthwise direction reference surface 51A, and increase the contact pressure between the cleaved surfaces of the first and second magnet fragments 31 and in turn the contact force between these magnet fragments increases. Thereby, the second magnet fragment 31 can be accurately aligned and positioned relative to the first magnet fragment 31.

Next, the third and subsequent magnet fragments 31 are sequentially positioned in the same manner by the thickness direction pressing means 54 and the width direction pressing means 55. Thereby, the magnet fragments 31 can be reliably aligned one by one, and thus lamination deviations of the magnet fragments 31 can be suppressed.

In the present embodiment, the pressing order and the arrangement of the operational axis lines of the thickness direction pressing means 54 and the width direction pressing means 55, the method for inserting the magnet fragments 31 into the integrating device 50, the specific structure of the thickness direction pressing means 54 and the width direction pressing means 55, and the like can be modified as in the first embodiment.

In the present embodiment, the following effects are also achieved in addition to the effects described in (A) above of the first embodiment.

(B) The thickness direction pressing means 54 and the width direction pressing means 55 as the first and second pressing means first apply a pressing force on the magnet fragment that is near the lengthwise direction reference surface 51A, and then sequentially apply a pressing force on the magnet fragments 31 one by one moving away from the lengthwise direction reference surface 51A. By tilting the operational axis lines so that they approach the lengthwise direction reference surface 51A at the tip side thereof in both or either one of the width direction pressing means 55 and the thickness direction pressing means 54, a component force toward the lengthwise direction reference surface 51A is added to each magnet fragment 31. This component force presses the magnet fragments 31 toward the lengthwise direction reference surface 51A. As a result, the contact pressure between the cleaved surfaces of the magnet fragments 31 increases, and in turn the contact force between the magnet fragments can be increased. Therefore, the magnet fragments 31 can be reliably aligned one by one, and lamination deviations of the magnet fragments 31 can be suppressed.

In the above-described embodiments, surfaces that contact the entire edge surface of the magnet fragment were used as reference surfaces in the width direction, thickness direction, and lengthwise direction. However, reference surfaces having, for example, a pin shape that contacts a portion of the edge surface can also be used. Further, the reference surfaces in the width direction, thickness direction, and lengthwise direction do not have to be completely fixed and positioned, and instead they can be configured to press the magnet fragments by moving in the width direction, thickness direction, and lengthwise direction.

The present application claims priority based on Japanese Patent Application No. 2011-267721 filed at the Japan Patent Office on Dec. 7, 2011, the entire contents of which are expressly incorporated herein by reference.

The invention claimed is:

1. A device for manufacturing a field pole magnet body that is to be installed in a rotating electric machine and is manufactured by aligning and bonding a plurality of magnet fragments formed by cleaving and dividing a magnet body in a width direction, the device comprising:
   a reference jig having reference surfaces in a lengthwise direction, a width direction, and a thickness direction for positioning the plurality of cleaved and divided magnet fragments in an aligned state with the cleaved faces facing each other,
   a first pressing device configured to press the plurality of magnet fragments to the thickness direction reference surface from the thickness direction of the magnet body to align the magnet fragments in the thickness direction, and
   a second pressing device configured to press the plurality of magnet fragments to the width direction reference surface from the width direction of the magnet body to align the magnet fragments in the width direction,
   wherein an operational axis line of a pressing part of at least one of the first and second pressing devices is arranged to be tilted such that the pressing part approaches the lengthwise direction reference surface at a side that abuts the magnet fragments.

2. The device for manufacturing a field pole magnet body according to claim 1, wherein the first and second pressing device first apply a pressing force on a magnet fragment that is near the lengthwise direction reference surface, and then sequentially apply a pressing force on each magnet fragment one by one moving away from the lengthwise direction reference surface.

3. A method for manufacturing a field pole magnet body that is to be installed in a rotating electric machine and is produced by aligning and bonding a plurality of magnet fragments formed by cleaving and dividing a magnet body in a width direction, the method comprising:
   aligning the plurality of cleaved and divided magnet fragments within a reference jig with the cleaved surfaces facing each other,
   pressing the plurality of aligned magnet fragments to a thickness direction reference surface of the reference jig from a thickness direction of the magnet body to align the magnet fragments in the thickness direction, and pressing the plurality of aligned magnet fragments to a width direction reference surface of the reference jig from a width direction of the magnet body to align the magnet fragments in the width direction, and
   aligning the magnet fragments in a state in which the magnet fragments are laminated relative to a lengthwise direction reference surface by a component force toward the lengthwise direction reference surface of the magnet fragments generated by tilting an operational axis line of a pressing part of at least one of a thickness direction pressing means and a width direction pressing means such that the pressing part approaches the lengthwise direction reference surface at a side that abuts the magnet fragments.

4. The method for manufacturing a field pole magnet body according to claim 3, wherein when aligning the plurality of magnet fragments in the thickness direction and the width direction by pressing the plurality of aligned magnet fragments to the thickness direction reference surface and the width direction reference surface of the reference jig from the thickness direction and the width direction of the magnet fragments, the pressing forces are first applied to a magnet fragment that is near the lengthwise direction reference surface, and then sequentially applied to each magnet fragment one by one moving away from the lengthwise direction reference surface.

\* \* \* \* \*